United States Patent [19]
Jacobus et al.

[11] Patent Number: 5,243,439
[45] Date of Patent: Sep. 7, 1993

[54] IMAGE RELOCATION IN AN ELECTRONIC REPROGRAPHIC SYSTEM

[75] Inventors: Christopher W. Jacobus; Kurt T. Knodt, both of Rochester; Daniel Fleysher, Pittsford, all of N.Y.

[73] Assignee: Xerox Corporation, Stamford, Conn.

[21] Appl. No.: 589,521

[22] Filed: Sep. 28, 1990

[51] Int. Cl.$^5$ .............................................. H04N 1/40
[52] U.S. Cl. .................. 358/448; 358/444; 358/404
[58] Field of Search ............ 358/403, 404, 444, 488, 358/448, 496, 462; 355/314

[56] References Cited

U.S. PATENT DOCUMENTS

| | | | |
|---|---|---|---|
| 4,641,197 | 2/1987 | Miyagi | 358/462 |
| 4,763,167 | 8/1988 | Watanabe et al. | 355/324 |
| 4,786,940 | 11/1988 | Daniele | 346/160 |
| 4,910,612 | 3/1990 | Yamazaki | 358/444 |
| 4,918,490 | 4/1990 | Stemmle | 355/318 |
| 5,079,549 | 1/1992 | Kato et al. | 355/313 |
| 5,097,341 | 3/1992 | Forest | 355/444 |

FOREIGN PATENT DOCUMENTS 1531401  11/1978  United Kingdom .

Primary Examiner—Edward L. Coles, Sr.
Assistant Examiner—Thomas L. Stoll
Attorney, Agent, or Firm—Oliff & Berridge

[57] ABSTRACT

The automatic relocation of images in an electronic reprographic system includes scanning documents comprising a print job, converting the documents to electronic manipulatable images, storing the images for print generation and shifting the locations of the scanned images to obtain a desired output. The location shifting can provide a one-sided cover page for a print job having a duplex arrangement, reordering to form duplex output from simplex input and joinder of a plurality of sets of documents without gap generation therebetween.

2 Claims, 12 Drawing Sheets

IMAGE RELOCATION IN AN ELECTRONIC REPROGRAPHIC SYSTEM

BACKGROUND OF THE INVENTION

1. Field of the Invention

The present invention relates to a system of electronic reprographics and, more particularly, to a system of electronic reprographics in which the locations of scanned images are shifted to obtain a desired output.

2. Description of the Related Art

In light lens printing systems, a lamp or flashing unit flashes light on a document and has a reflected image created synchronously on a photoreceptor belt. The photoreceptor belt picks up toner from which a copy is made. Image relocation and/or reorder is not possible since the reflected image is immediately transferred onto the photoreceptor and fused onto a sheet of paper.

The generation of a one-sided (simplex) cover sheet on a two-sided (duplex) page using a light lens printing system requires the dropping off of an image from the backside of the cover page. This comprises not flashing the backside of the first original so that a blank is left on the page. The backside image is automatically deleted without the consent of the user and can therefore result in the loss of important data.

The generation of duplex output from simplex input using the recirculating document handler of a light lens printing system can be very time consuming. The documents must be circulated a first time for counting purposes and a second time for image scanning purposes. The first circulation is necessary because of the difference in output structure of an odd versus an even number of originals. When an even number of originals are counted, no output pages will be blank. When an odd number of originals is counted, the backside of the last page of the job will be blank. The dual circulation takes an extremely long amount of time, particularly when jobs with a large number of originals are circulated.

The generation of a scan job in a light lens printing system is completed when the system cycles down. Sets of documents which may be scanned at different times cannot be combined unless a simplex-to-simplex arrangement is desired. It is otherwise likely that gaps will occur between the sets of documents.

By contrast, in electronic reprographic printing systems, a document or series of documents comprising at least one print job are successively scanned. Upon scanning of the documents, image signals are obtained and electronically stored. The signals are then read out successively and transferred to a printer for formation of the images on paper. Once a document is scanned, it can be printed any number of times or processed in any number of ways (e.g., words deleted or added, image magnified or reduced, etc.). If a plurality of documents comprise a job which is scanned, the processing or manipulation of the scanned documents can include deletion of one or more documents, reordering of the documents into a desired order, or addition of a previously or subsequently scanned document or documents. The printing or processing can be relatively synchronous with scanning, or asynchronous after scanning. If asynchronous, a time interval exists between scanning and printing or processing. The system can then accumulate a number of scanned jobs in the system memory for subsequent processing or printing. The order of the jobs to be printed may be different from the order of jobs as scanned depending on the priority of the jobs and the desires of the operator for increasing productivity or through-put and decreasing printer or scanner downtime.

Printing systems have been described which provide adjustments prior to formation of a copy sheet.

U.S. Pat. No. 4,611,908 to Buch discloses a programmed display for use with a printer. The display can be adjusted by an operator without requiring the formation of a proof copy. The adjustments which can be performed include input of margin size information, adjustment of viewable delineation between an image area and a margin area on the display and adjustment of the timing of a flash exposure of a document on a photoconductor.

U.S. Pat. No. 4,674,864 to Stakenborg et al discloses a reproduction device for making simplex or duplex copies. The control unit of the device receives data concerning margin width of the original to be reproduced and of the copies to be produced.

While the above-described systems provide adjustments prior to formation of copy sheets, they do not enable relocation and manipulation of images stored in memory.

It would thus be desirable to provide an electronic reprographic printing system with the capability to automatically relocate images stored in memory in accordance with the type of output desired.

OBJECTS AND SUMMARY OF THE INVENTION

Accordingly, one object of the present invention is to provide an electronic reprographic printing system which automatically relocates images stored in memory in accordance with the type of output desired.

Another object of the present invention is to provide an electronic reprographic system which enables manipulation of images without resulting in the loss of important data.

Another object of the present invention is to provide an electronic reprographic system which provides a desired form of output without resulting in an increase in the time necessary to generate the output.

A further object of the present invention is to provide an electronic reprographic system which enables the generation of a single job from a plurality of sets of original documents scanned by different scan sources or at different times.

To achieve the foregoing and other objects and advantages, and to overcome the shortcomings discussed above, an electronic reprographic system for printing a job is provided which includes automatic relocation of images. A set or sets of original documents comprising a print job are scanned, the documents are converted to electronic manipulatable images, the images are stored for print generation and the locations of the scanned images are shifted to obtain a desired output. The location shifting can provide a one-sided cover page for a print job having a duplex arrangement, reordering to form duplex output from simplex output and joinder of a plurality of sets of documents without gap generation therebetween.

BRIEF DESCRIPTION OF THE DRAWINGS

The invention will be described in detail with reference to the following drawings in which like reference numerals refer to like elements and wherein.

DETAILED DESCRIPTION OF THE PREFERRED EMBODIMENTS

A. The System

Figure 1:
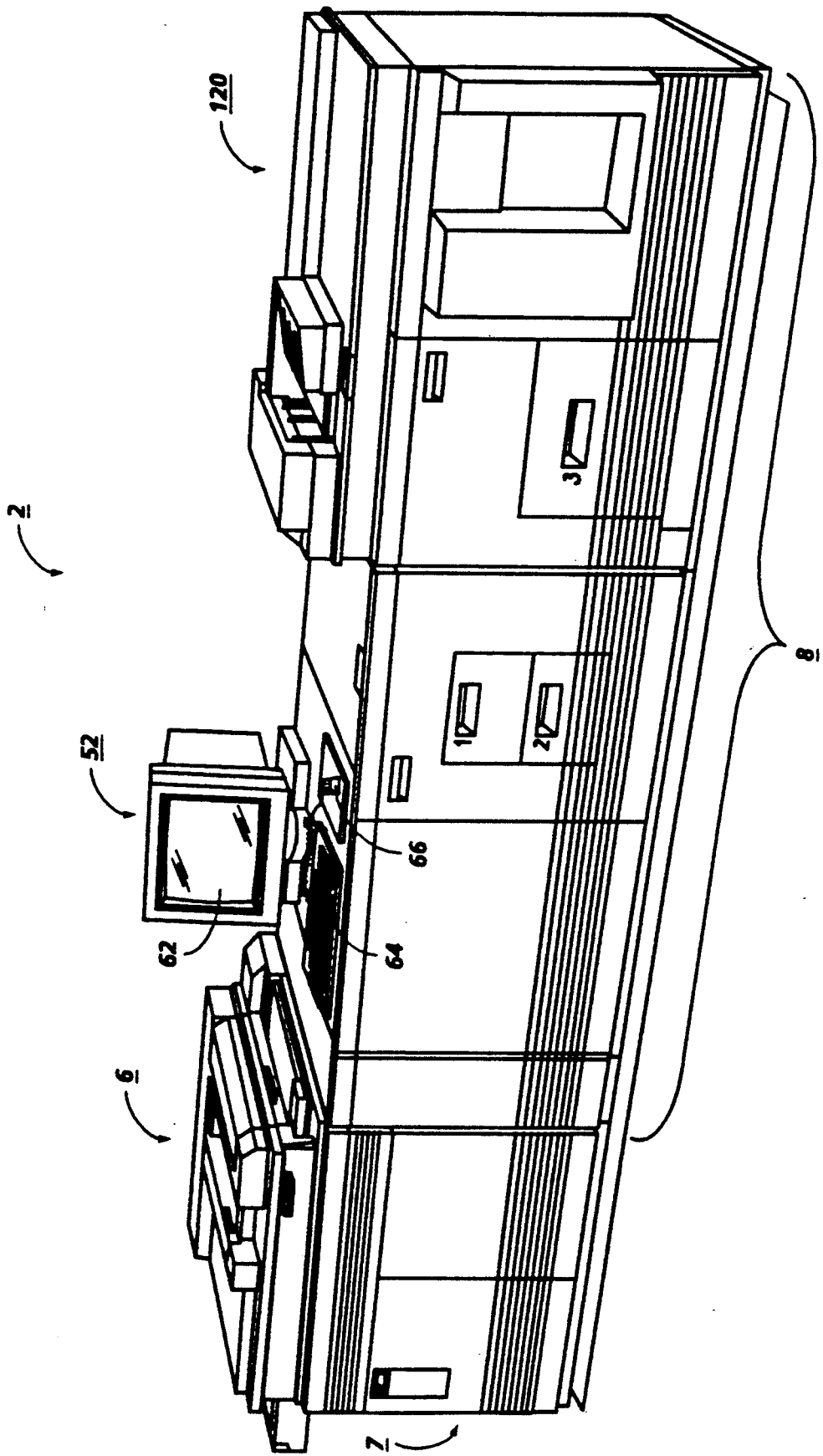
FIG. 1 is a view depicting an electronic printing system incorporating the print media identification system of the present invention.
Figure 2:
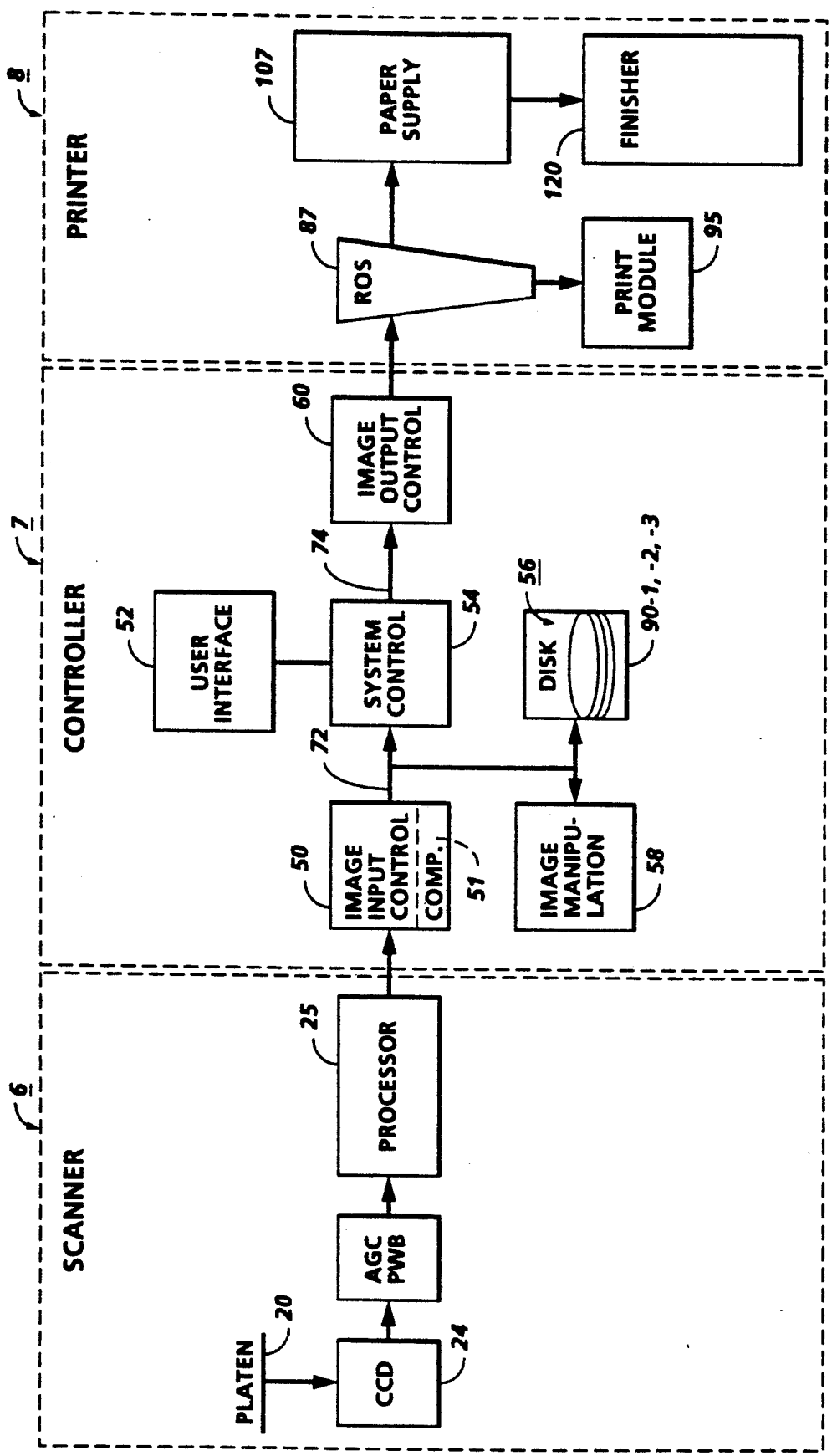
FIG. 2 is a block diagram depicting the major elements of the printing system shown in FIG. 1.

Referring now to the drawings, and particularly to FIGS. 1 and 2 thereof, there is shown an exemplary laser based printing system 2 for processing print jobs in accordance with the teachings of the present invention. Printing system 2, for purposes of explanation, is divided into a scanner section 6, controller section 7, and printer section 8. While a specific printing system is shown and described, the present invention may be used with other types of printing systems such as ink jet, ionographic, etc.

Figure 3:
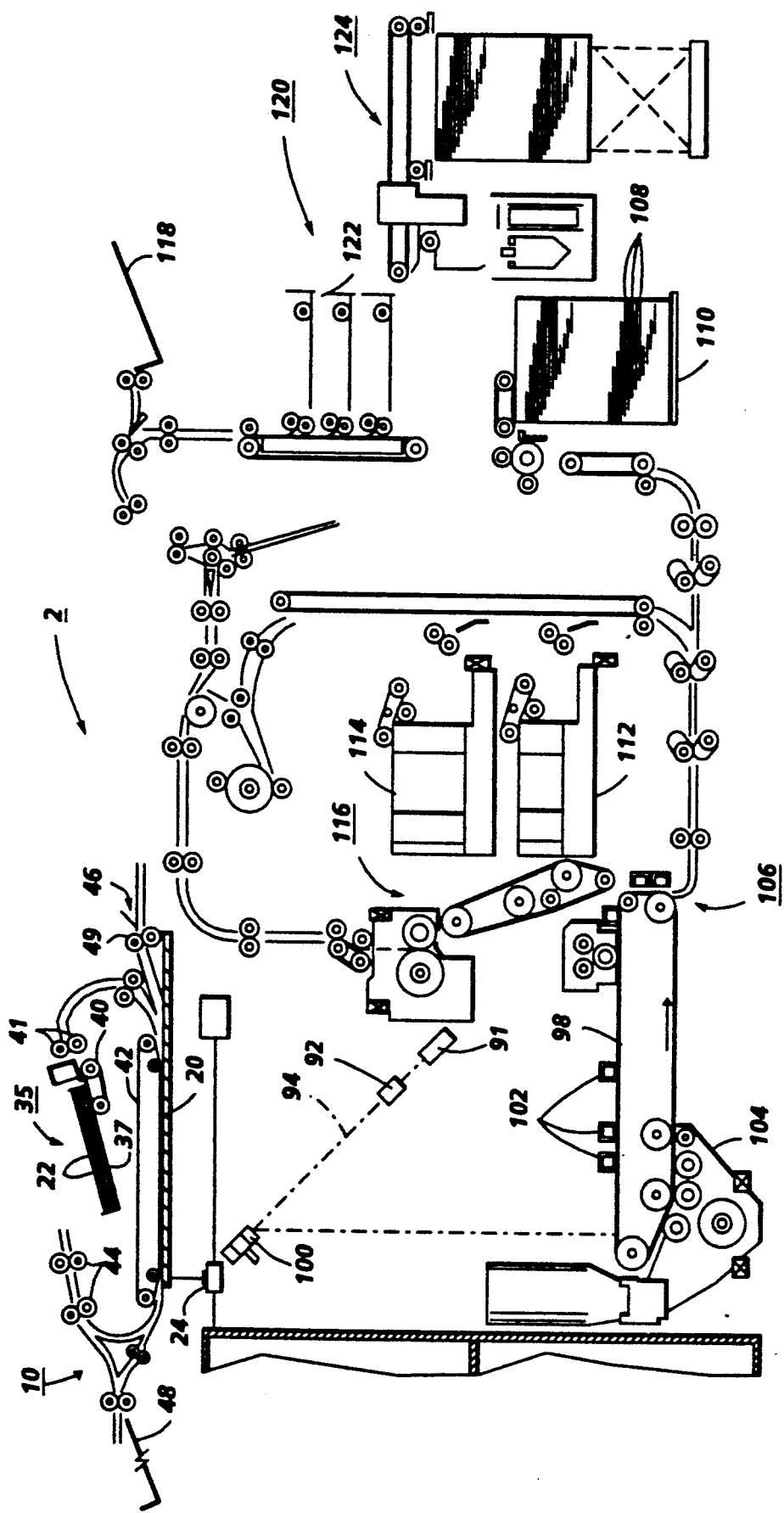
FIG. 3 is a plan view illustrating the principal mechanical components of the printing system shown in FIG. 1.
Figure 4:
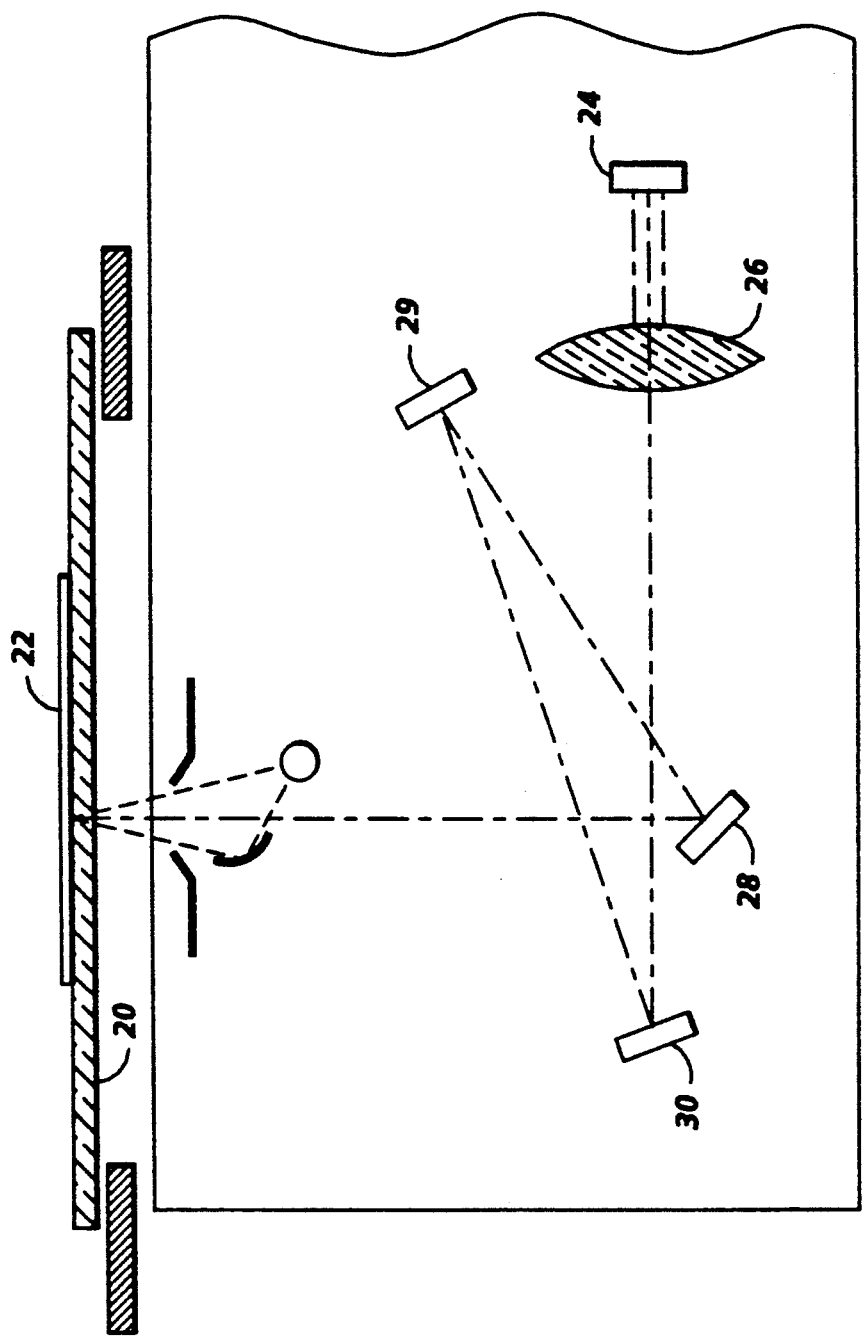
FIG. 4 is a schematic view showing certain construction details of the document scanner for the printing system shown in FIG. 1.

Referring particularly to FIGS. 2-4, scanner section 6 incorporates a transparent platen 20 on which the document 22 to be scanned is located. One or more linear arrays 24 are supported for reciprocating scanning movement below platen 20. Lens 26 and mirrors 28, 29, 30 cooperate to focus array 24 on a line-like segment of platen 20 and the document being scanned thereon. Array 24 provides image signals or pixels representative of the image scanned which, after suitable processing by processor 25, are output to controller section 7.

Processor 25 converts the analog image signals output by array 24 to digital and processes the image signals as required to enable system 2 to store and handle the image data in the form required to carry out the job programmed. Processor 25 also provides enhancements and changes to the image signals such as filtering, thresholding, screening, cropping, reduction/enlarging, etc. Following any changes and adjustments in the job program, the document must be rescanned.

Documents 22 to be scanned may be located on platen 20 for scanning by automatic document handler (ADF) 35 operable in either a Recirculating Document Handling (RDH) mode or a Semi-Automatic Document Handling (SADH) mode. A manual mode including a Book mode and a Computer Forms Feeder (CFF) mode are also provided, the latter to accommodate documents in the form of computer fanfold. For RDH mode operation, document handler 35 has a document tray 37 in which documents 22 are arranged in stacks or batches. The documents 22 in tray 37 are advanced by vacuum feed belt 40, document feed rolls 41 and document feed belt 42 onto platen 20 where the document is scanned by array 24. Following scanning, the document is removed from platen 20 by belt 42 and returned to tray 37 by document feed rolls 44.

For operation in the SADH mode, a document entry slot 46 provides access to the document feed belt 42 between tray 37 and platen 20 through which individual documents may be inserted manually for transport to platen 20. Feed rolls 49 behind slot 46 form a nip for engaging and feeding the document to feed belt 42 and onto platen 20. Following scanning, the document is removed from platen 20 and discharged into catch tray 48.

For operation in the CFF mode, computer forms material is fed through slot 46 and advanced by feed rolls 49 to document feed belt 42 which in turn advances a page of the fanfold material into position on platen 20.

Referring to FIGS. 2 and 3, printer section 8 comprises a laser type printer and, for purposes of explanation, is separated into a Raster Output Scanner (ROS) section 87, Print Module Section 95, Paper Supply section 107, and Finisher 120. ROS 87 has a laser 90, the beam of which is split into two imaging beams 94. Each beam 94 is modulated in accordance with the content of an image signal input by acousto-optic modulator 92 to provide dual imaging beams 94. Beams 94 are scanned across a moving photoreceptor 98 of Print Module 95 by the mirrored facets of a rotating polygon 100 to expose two image lines on photoreceptor 98 with each scan and create the latent electrostatic images represented by the image signal input to modulator 92. Photoreceptor 98 is uniformly charged by corotrons 102 at a charging station preparatory to exposure by imaging beams 94. The latent electrostatic images are developed by developer 104 and transferred at transfer station 106 to a print media 108 delivered by Paper Supply section 107. Media 108 as will appear may comprise any of a variety of sheet sizes, types, and colors. For transfer, the print media is brought forward in timed registration with the developed image on photoreceptor 98 from either a main Paper tray 110 or from auxiliary Paper trays 112, or 114. The developed image transferred to the print media 108 is permanently fixed or fused by fuser 116 and the resulting prints discharged to either output tray 118, or to finisher 120. Finisher 120 includes a stitcher 122 for stitching or stapling the prints together to form books and a thermal binder 124 for adhesively binding the prints into books.

Referring to FIGS. 1, 2 and 5, controller section 7 is, for explanation purposes, divided into an image input controller 50, User Interface (UI) 52, system controller 54, main memory 56, image manipulation section 58, and image output controller 60.

Figure 5A:
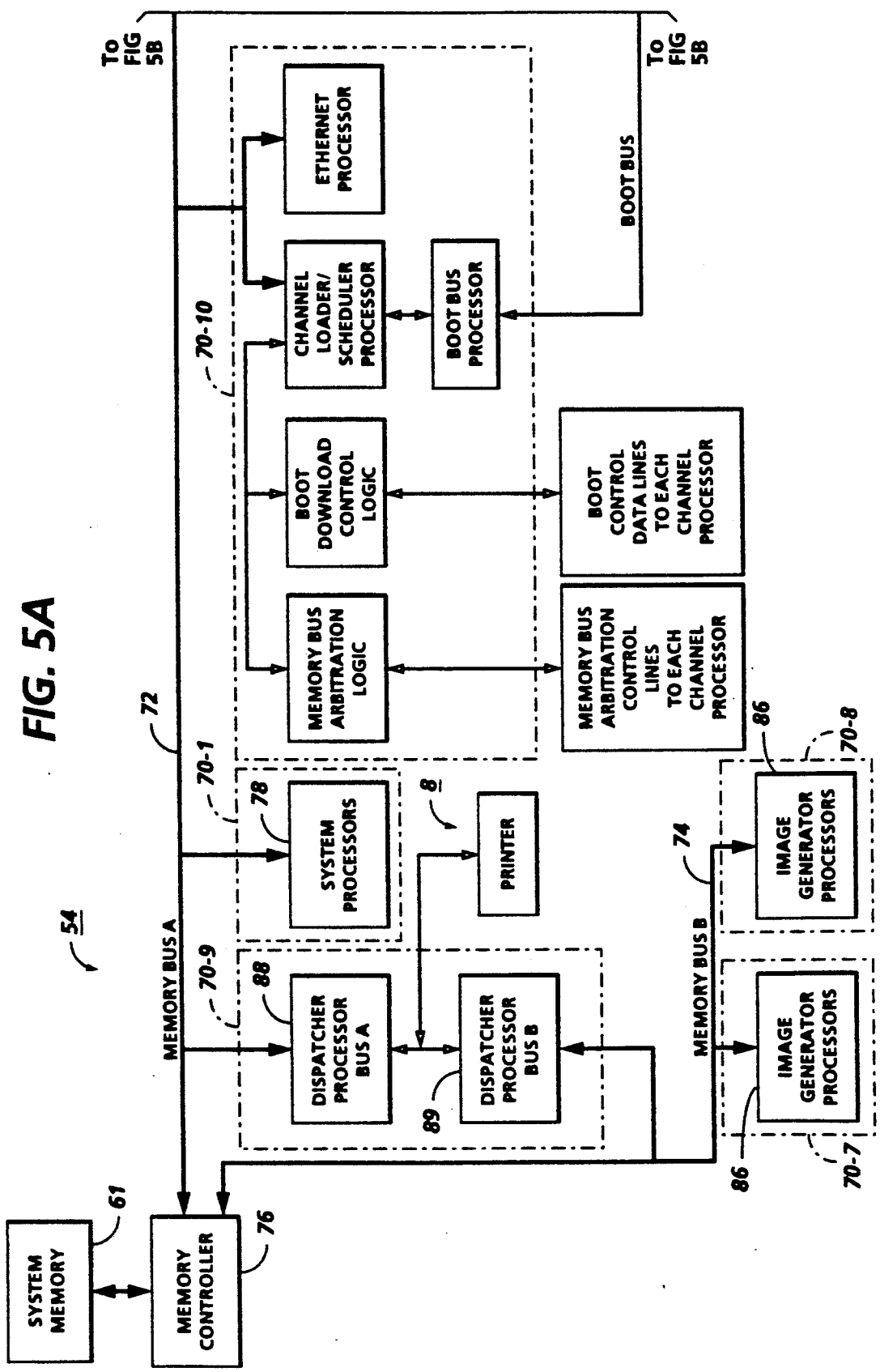
FIGS. 5A, 5B, and 5C comprise a schematic block diagram showing the major parts of the control section for the printing system shown in FIG. 1.
Figure 5B:
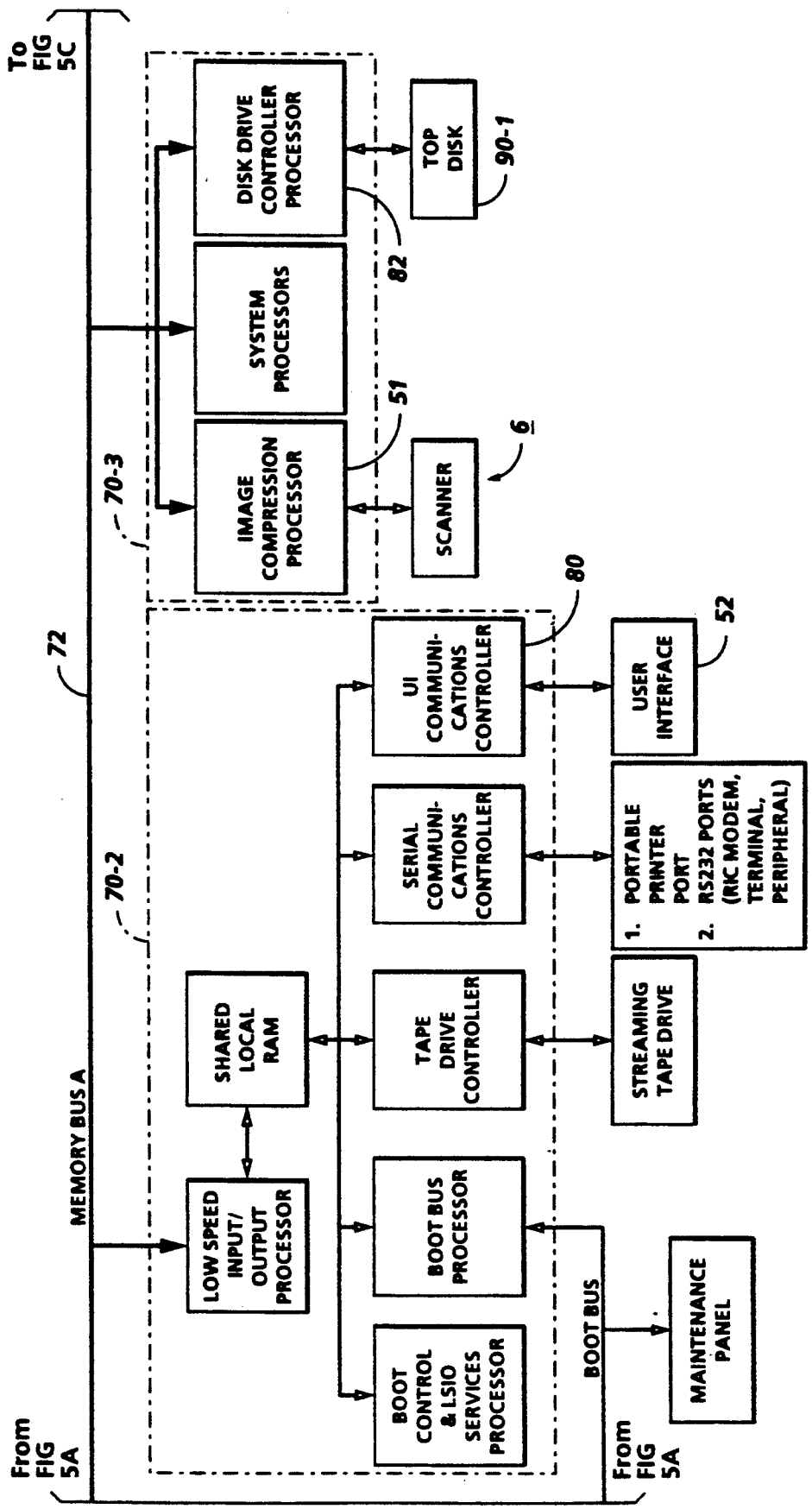
Figure 5C:
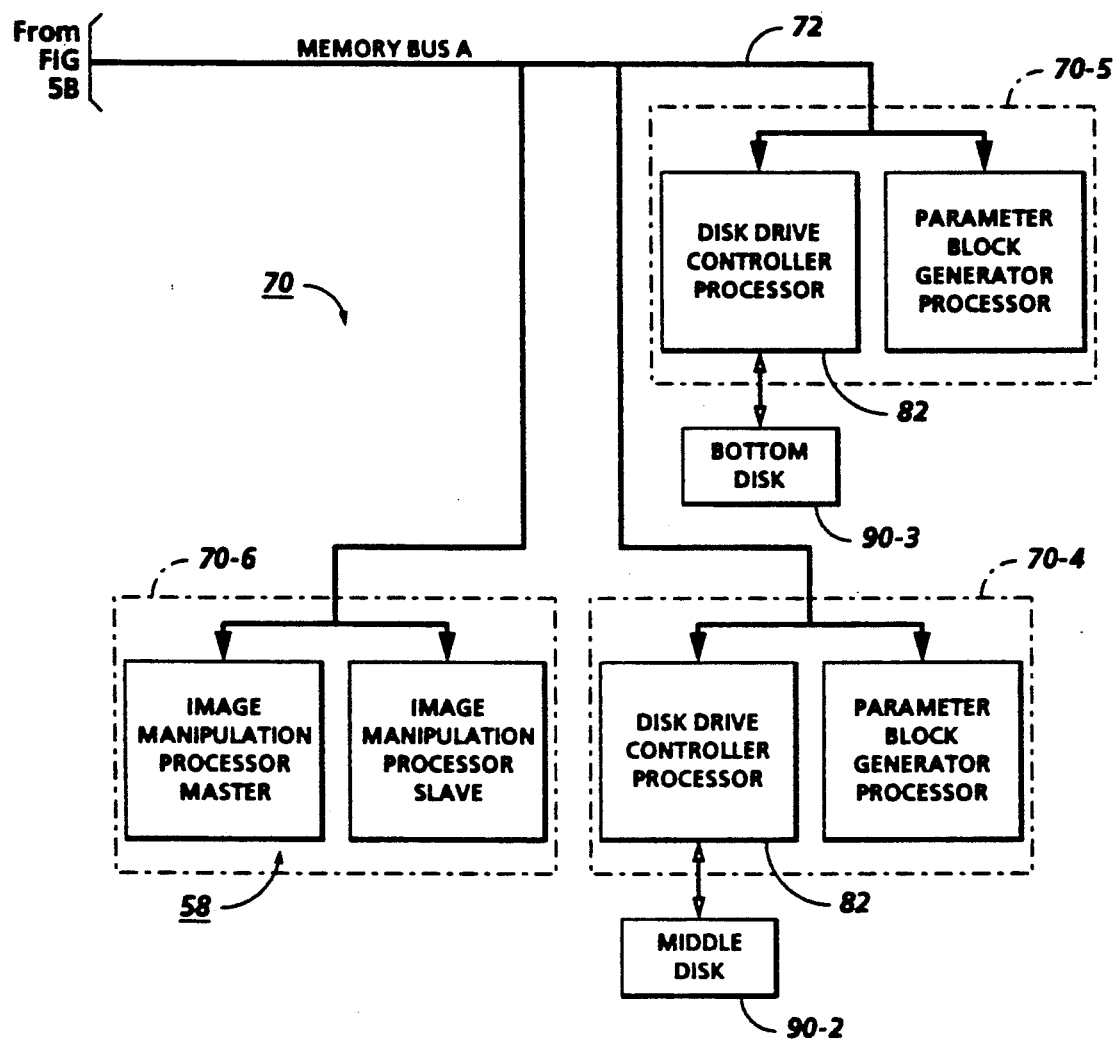

Referring particularly to FIGS. 5A-5C, control section 7 includes a plurality of Printed Wiring Boards (PWB's) 70, PWB's 70 being coupled with one another and with System Memory 61 by a pair of memory buses 72, 74. Memory controller 76 couples System Memory 61 with buses 72, 74. PWB's 70 include system processor PWB 70-1 having plural system processors 78; low speed I/O processor PWB 70-2 having UI communication controller 80 for transmitting data to and from UI 52; PWB's 70-3, 70-4 and 70-5 having disk drive controller/processors 82 for transmitting data to and from disks 90-1, 90-2 and 90-3, respectively, of main memory 56 (image compressor/processor 51 for compressing the image data is on PWB 70-3); image manipulation PWB 70-6 with image manipulation processors of image manipulation section 58; image generation processor PWB's 70-7 and 70-8 with image generation processor 86 for processing the image data for printing by printer section 8; dispatch processor PWB 70-9 having dispatch processors 88 and 89 for controlling transmission of data to and from printer section 8; and boot control-arbitration-scheduler PWB 70-10.

The scanned image data input from processor 25 of scanner section 6 to controller section 7 is compressed by image compressor/processor 51 of image input controller 50 on PWB 70-3. As the image data passes through compressor/processor 51, it is segmented into slices N scanlines wide, each slice having a slice pointer. The compressed image data together with slice printers and any related image descriptors providing image specific information (such as height and width of the document in pixels, the compression method used, pointers to the compressed image data, and pointers to the image slice pointers) are placed in an image file. The image files, which represent different print jobs, are temporarily stored in system memory 61 which comprises a Random Access Memory or RAM pending transfer to main memory 56 where the data is held pending use.

As best seen in FIG. 1, UI 52 includes a combined operator controller/CRT display consisting of an interactive touchscreen 62, keyboard 64, and mouse 66. UI 52 interfaces the operator with printing system 2, enabling the operator to program print jobs and other instructions, to obtain system operating information, instructions, programming information, diagnostic information, etc. Items displayed on touchscreen 62 such as files and icons are actuated by either touching the displayed item on screen 62 with a finger or by using mouse 66 to point cursor 67 to the item selected and keying the mouse.

Main memory 56 has plural hard disks 90-1, 90-2, 90-3 for storing machine Operating System software, machine operating data, and the scanned image data currently being processed.

When the compressed image data in main memory 56 requires further processing, or is required for display on touchscreen 62 of UI 52, or is required by printer section 8, the data is accessed in main memory 56. Where further processing other than that provided by processor 25 is required, the data is transferred to image manipulation section 58 on PWB 70-6 where the additional processing steps such as collation, make ready, decomposition, etc., are carried out. Following processing, the data may be returned to main memory 56, sent to UI 52 for display on touchscreen 62, or sent to image output controller 60.

Image data output to image output controller 60 is decompressed and readied for printing by image generating processors 86 of PWB's 70-7, 70-8 (seen in FIG. 5A). Following this, the data it output by dispatch processors 88, 89 on PWB 70-9 to printer section 8. Image data sent to printer section 8 for printing is normally purged from memory 56 to make room for new image data.

Figure 6:
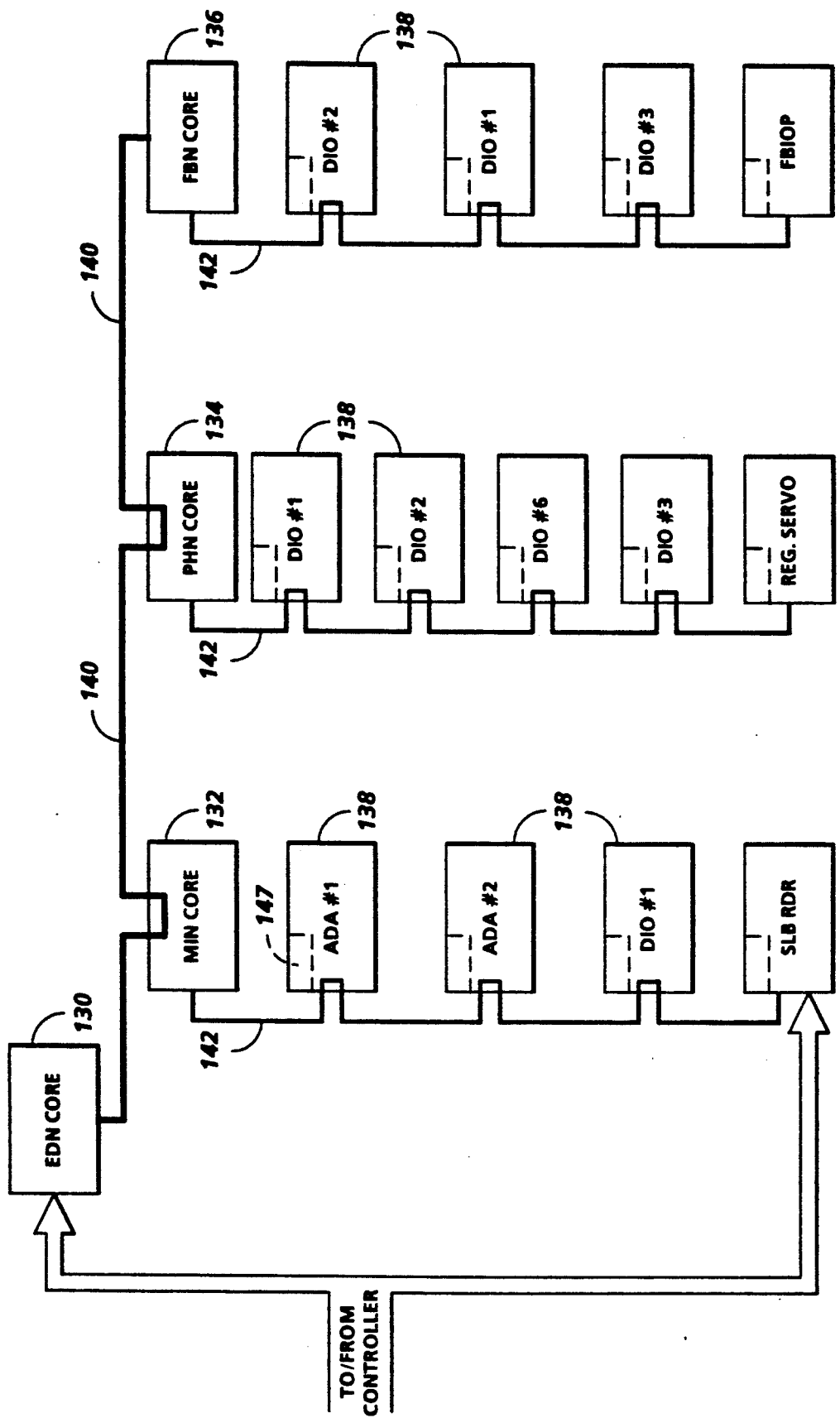
FIG. 6 is a block diagram of an Operating System, together with Printed Wiring Boards and shared line connections for the printing system shown in FIG. 1.

Referring particularly to FIG. 6, system control signals are distributed via a plurality of printed wiring boards (PWB's). These include EDN core PWB 130, Marking Imaging core PWB 132, Paper Handling core PWB 134, and Finisher Binder core PWB 136 together with various Input/Output (I/O) PWB's 138. A system bus 140 couples the core PWB's 130, 132, 134 and 136 with each other and with controller section 7 while local buses 142 serve to couple the I/O PWB's 138 with each other and with their associated core PWB.

On machine power up, the Operating System software is loaded from memory 56 to EDN core PWB 130 and from there to the remaining core PWB's 132, 134 and 136 via bus 140, each core PWB 130, 132, 134, 136 having a boot ROM (not shown) for controlling downloading of Operating System software to the PWB, fault detection, etc. Boot ROMs also enable transmission of Operating System software and control data to and from PWB's 130, 132, 134 and 136 via bus 140 and control data to and from I/O PWB's 138 via local buses 142. Additional ROM, RAM, and NVM memory types are resident at various locations within system 2.

Figure 7:
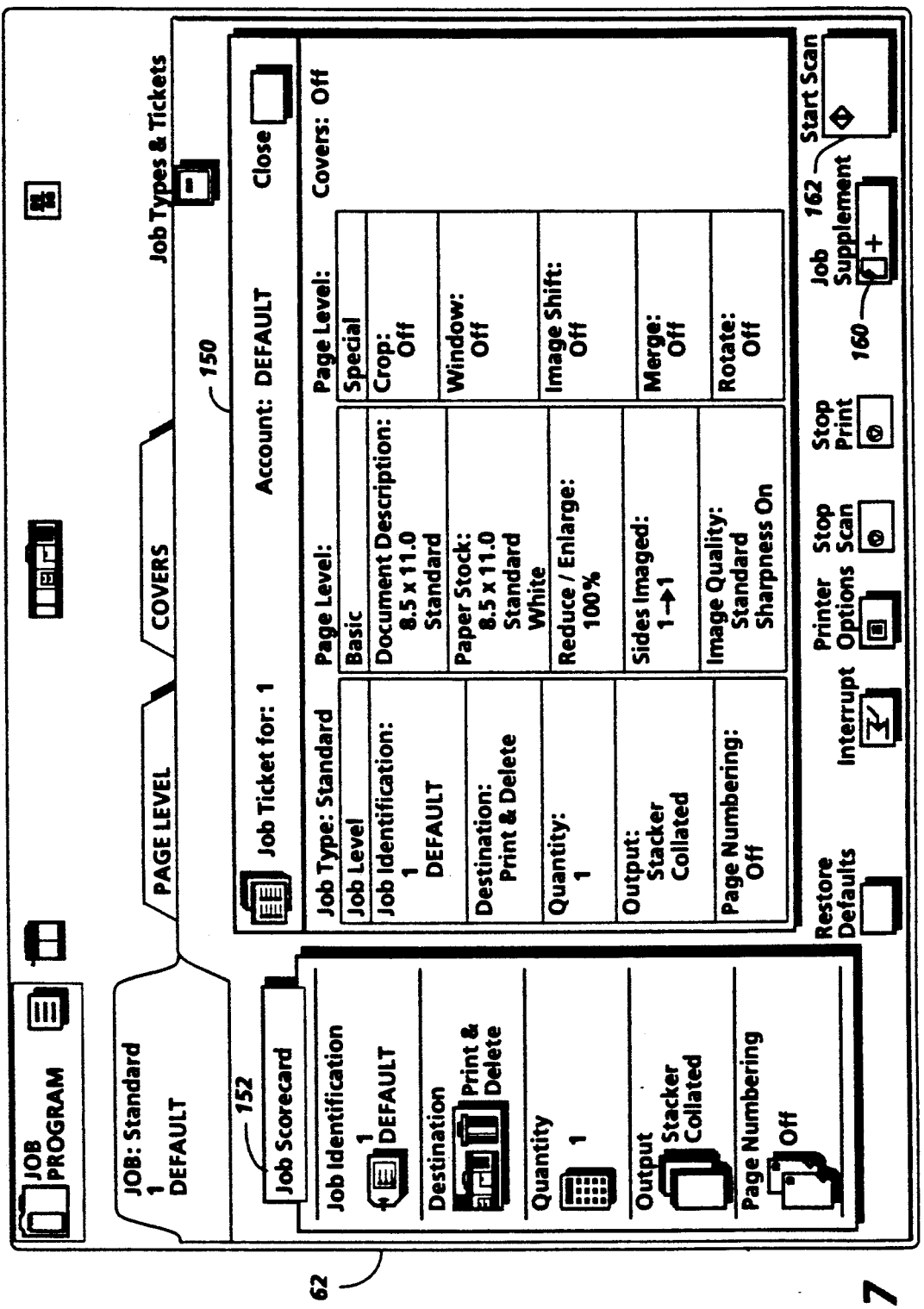
FIG. 7 is a view depicting an exemplary job programming ticket and job scorecard displayed on the User Interface (UI) touchscreen of the printing system shown in FIG. 1.

Referring to FIG. 7, jobs are programmed in a Job Program mode in which there is displayed on touchscreen 62 a Job Ticket 150 and a Job Scorecard 152 for the job being programmed. Job Ticket 150 displays various job selections programmed while Job Scorecard 152 displays the basic instructions to the system for printing the job.

B. Image Relocation

Figure 8:
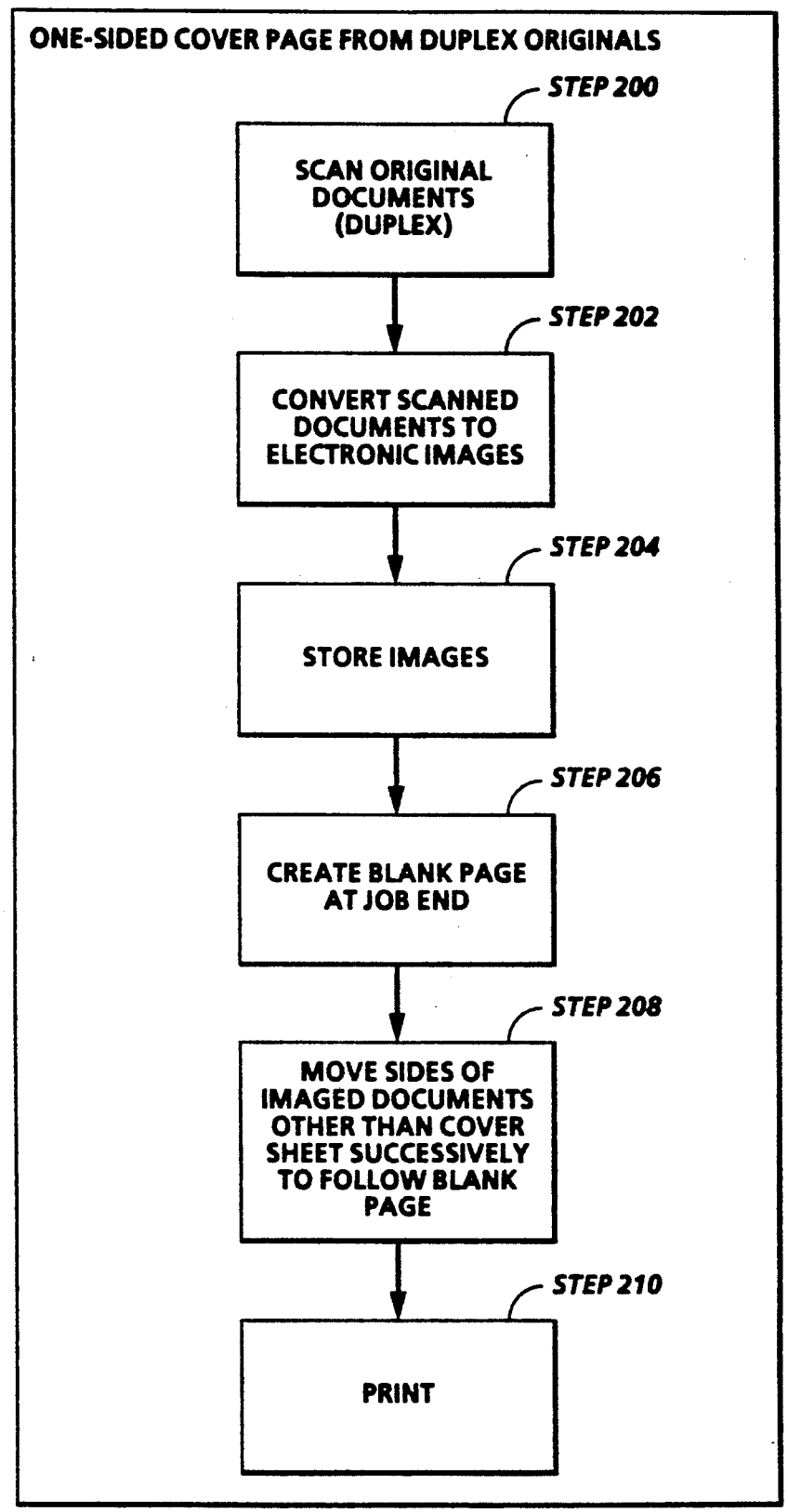
FIG. 8 is a flowchart depicting the operation of the FIG. 1 system to provide a one-sided cover page according to the present invention.

Referring to FIG. 8 there is shown a flowchart depicting the operation of system 2 to create a one-sided cover page from duplex originals. The scanning of the original duplex documents (Step 200) is initiated with each document being scanned in scanner section 6. The scanned documents are converted to electronic images (Step 202) and are electronically stored (Step 204) in System Memory 61 and in Main Memory 56 for transfer to a printer 8 or to image manipulation section 58 for image processing. Image manipulation section 58 creates a blank page at the end of the job (Step 206). Image manipulation section 58 then successively moves each side of the image documents other than the cover sheet to immediately follow the created blank page (Step 208). A one-sided cover page remains upon movement of the sides of the imaged documents. The job can then be printed (Step 210) at printer section 8.

The one-sided cover page is automatically created without any risk of loss of important data. It requires a minimum amount of operator intervention, i.e., input by the operator to user interface 52 to instruct the system to generate a one-sided cover page from the duplex original documents.

Figure 9:
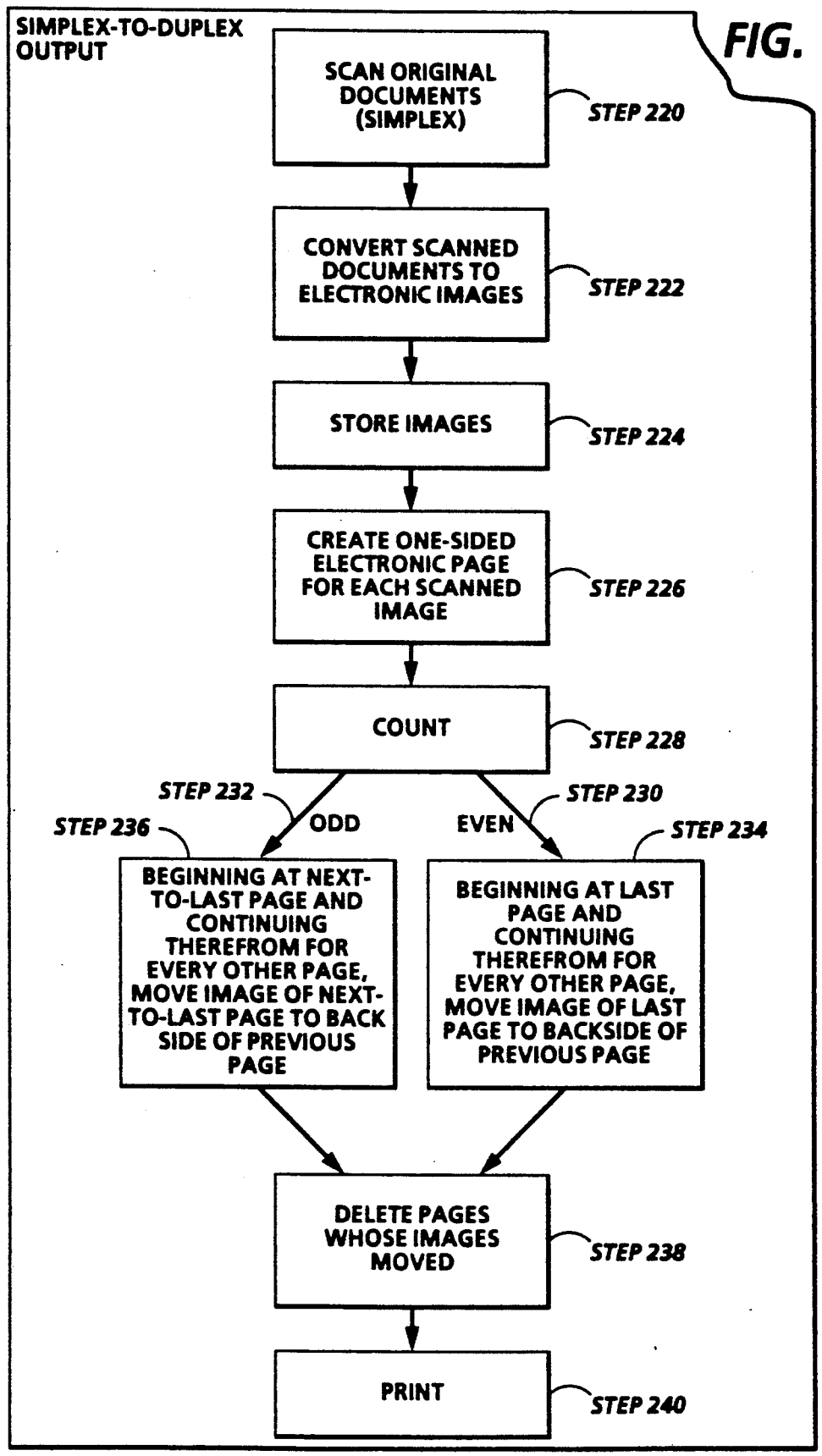
FIG. 9 is a flowchart depicting the operation of the FIG. 1 system to provide duplex output from simplex input according to the present invention.

Referring to FIG. 9, there is shown a flowchart depicting the operation of system 2 to provide duplex output from simplex input. Scanning of the original simplex documents (Step 220) is initiated by an operator at user interface 52. As successive documents are scanned in scanner section 6, the documents are converted to electronic images (Step 222) and are electronically stored (Step 224) in system memory 61 and in main memory 56. Image manipulation section 58 creates a one-sided electronic page for each scanned image (Step 226) and counts the number of electronic pages created (Step 228). If it is determined that the number of electronic pages created is odd (Step 232), beginning at the next-to-last page and continuing therefrom for every other page, image manipulation section 58 moves the image of the next-to-last page to the backside of the previous page (Step 236). If, however, it is determined that an even number of electronic pages have been created (Step 230), beginning at the last page and continuing therefrom for every other page, image manipulation section 58 moves the image of the last page to the backside of the previous page (Step 234). The resulting blank electronic pages whose images have been moved to previous pages are then deleted (Step 238), leaving a plurality of duplex electronic pages for output by printing section 8 (Step 240).

This generation of duplex output saves considerable time, particularly for jobs with a large number of originals, since the set of original documents need only be circulated through the RDH once. By contrast, in the traditional light lens printing system, the documents needed to be circulated twice, once to count them and a second time to scan the images.

Figure 10:
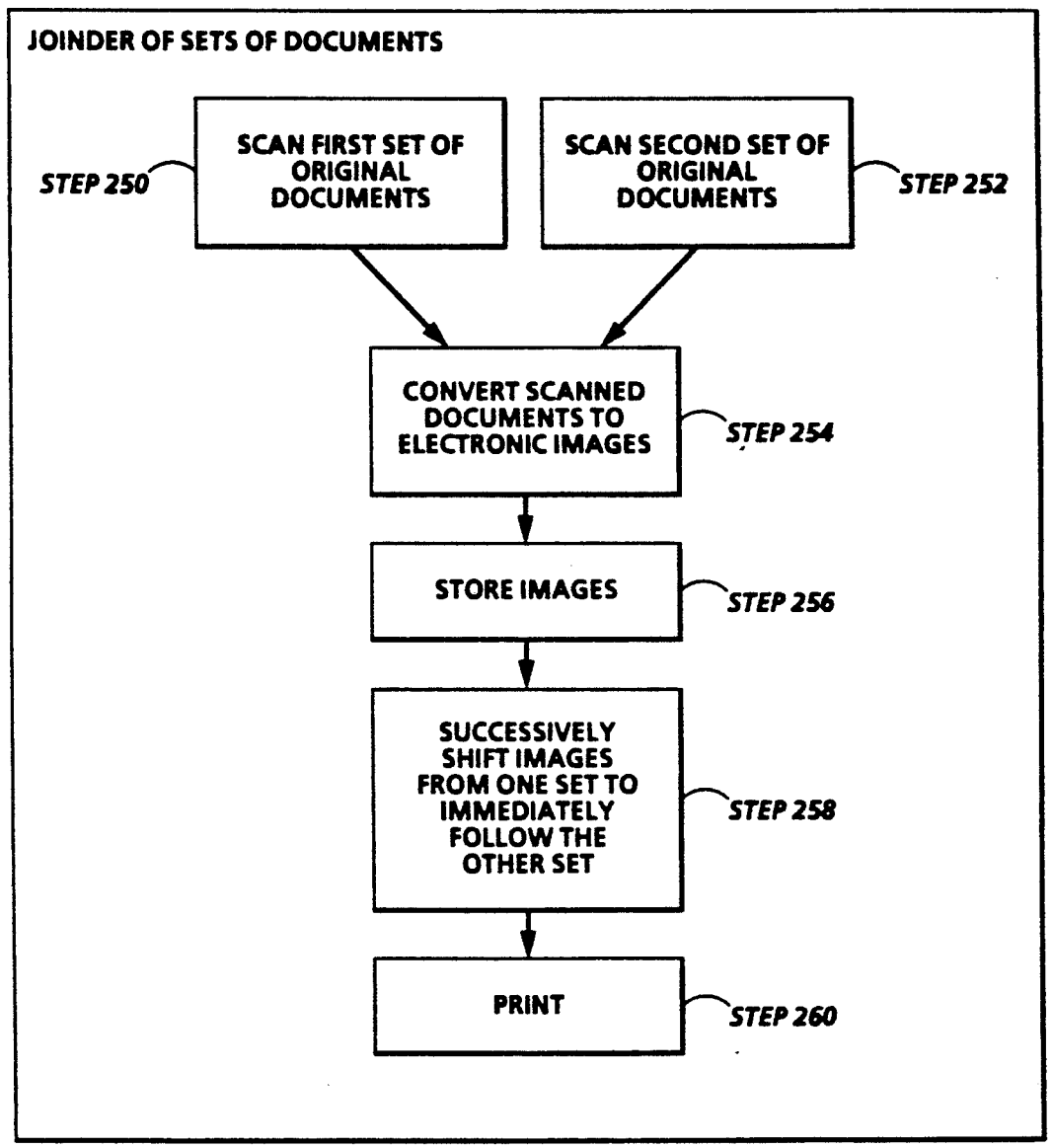
FIG. 10 is a flowchart depicting the operation of the FIG. 1 system to provide congruous joinder of sets of documents forming a single job according to the present invention.

Referring to FIG. 10, there is shown a flowchart depicting the operation of system 2 to provide joinder of sets of documents. For illustrative purposes, FIG. 10 illustrates joinder of two sets of documents. A first set of original documents is scanned (Step 250) by one scanning source. A second set of original documents is scanned (Step 252) by a second scanning source or, alternatively, by the same scanning source that scans the first set but at a different time. The scanned documents are converted to electronic images (Step 254) and are electronically stored in system memory 61 and in main memory 56 (Step 256). Image manipulation section 58 then successively shifts images from one set to immediately follow the other set (Step 258) in a congruous manner without providing any gaps therebetween. The original documents can be in a simplex or duplex arrangement. If both arrangements are duplex, the images from one set are simply shifted onto the backside of the first set in a successive manner.

This type of joinder of sets of documents allows for a supplement job to appear as if it had been scanned from the same scan source as the original job. The printing system is not required to cycle down, thereby reducing the time required to join sets of documents.

While this invention has been described in conjunction with specific embodiments thereof, it is evident that many alternatives, modifications and variations will be apparent to those skilled in the art. For example, the described operations of system 2 can be combined to provide image relocation and reorder prior to printout. Two sets of documents could be reordered to provide duplex output from simplex input as described with respect to FIG. 9, and the reordered images could be joined as set forth with respect to FIG. 10. The scanned documents can be processed or manipulated to add, relocate or reorder documents in any desired manner. Accordingly, the preferred embodiments of the invention as set forth herein are intended to be illustrative, not limiting. Various changes may be made without departing from the spirit and scope of the invention as defined in the following claims.

What is claimed is:

1. A method of relocating images in an electronic reprographic system, comprising the steps of:

scanning a set of original documents having a duplex page arrangement which comprise a print job;

converting the scanned documents to electronic pages comprising manipulatable images;

storing said images for print generation; and shifting the locations of the electronic pages to obtain any desired output, said desired output being selected from a plurality of images including deleted page images, added page images, reordered page images and relocated page images, wherein said shifting step includes automatically relocating the electronic pages to obtain a one sided cover page, said step of automatically relocating including:

a) creating a blank electronic page at the end of the print job; and b) successively moving each side of the imaged documents other than the cover sheet to immediately follow the created blank page, thereby providing a one sided cover page.

2. An apparatus for relocating images in an electronic reprographic system comprising:

scanning means for scanning a set of original documents having a duplex page arrangement which comprise a print job;

converter means for converting the scanned documents to electronic pages comprising manipulatable images;

storage means for storing said images for print generation; and shifting means for shifting the locations of the electronic pages to obtain any desired output, said desired output being selected from a plurality of images including deleted page images, added page images, reordered page images and relocated page images, wherein said shifting means automatically relocating the electronic pages to obtain a one sided cover page, said shifting means including:

a) means for creating a blank electronic page at the end of the print job; and b) means for successively moving each side of the imaged documents other than the cover sheet to immediately follow the created blank page, thereby providing a one sided cover page.

* * * * *